(12) United States Patent
Potter

(10) Patent No.: US 8,597,149 B2
(45) Date of Patent: Dec. 3, 2013

(54) SPLIT AXIS TRANSMISSION ARCHITECTURE

(75) Inventor: James Potter, Novi, MI (US)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/105,639

(22) Filed: May 11, 2011

(65) Prior Publication Data

US 2012/0289374 A1    Nov. 15, 2012

(51) Int. Cl.
*F16H 37/04*    (2006.01)
*F16H 3/56*    (2006.01)

(52) U.S. Cl.
USPC ............ 475/219; 475/272; 475/288; 475/343

(58) Field of Classification Search
USPC .......... 475/207, 214, 219, 272, 288, 302, 343
See application file for complete search history.

(56) References Cited

U.S. PATENT DOCUMENTS

| | | | |
|---|---|---|---|
| 2,972,899 A | | 4/1956 | Wiggermann |
| 4,468,980 A | | 9/1984 | Johansen |
| 6,811,508 B2 * | 11/2004 | Tumback ........................ 475/5 |
| 7,166,049 B2 * | 1/2007 | Saller ............................ 475/207 |
| 7,537,539 B2 | 5/2009 | Antonov et al. |
| 7,637,839 B2 * | 12/2009 | Hiraiwa ........................ 475/330 |
| 8,182,388 B2 * | 5/2012 | Gumpoltsberger .......... 475/330 |
| 2003/0199360 A1 | 10/2003 | Biallas |
| 2008/0134834 A1 | 6/2008 | Gitt et al. |
| 2008/0254932 A1 | 10/2008 | Heinzelmann |
| 2009/0107289 A1 | 4/2009 | Borntrager |
| 2010/0234168 A1 * | 9/2010 | Antonov et al. ............. 475/296 |

FOREIGN PATENT DOCUMENTS

| | | |
|---|---|---|
| DE | 12 49 708 B | 9/1967 |
| DE | 10 2005 046 894 A1 | 5/2007 |
| DE | 10 2006 024 370 A1 | 12/2007 |
| DE | 10 2008 001 200 A1 | 10/2009 |
| EP | 1 850 034 A2 | 10/2007 |
| FR | 2 862 363 A1 | 5/2005 |
| WO | 95/27158 A1 | 10/1995 |
| WO | 01/83249 A2 | 11/2001 |
| WO | 2007/009594 A1 | 1/2007 |
| WO | 2007/085741 A1 | 8/2007 |
| WO | 2007/115687 A1 | 10/2007 |
| WO | 2007/147800 A1 | 12/2007 |
| WO | 2009/127473 A1 | 10/2009 |
| WO | 2010/066489 A1 | 6/2010 |

OTHER PUBLICATIONS

European Search Report issued in European patent application No. 12163348.1, dated Jun. 22, 2012 (8 pages).
International Search Report issued in international application No. PCT/EP2009/063452, mailed Jan. 18, 2010 (2 pages).
International Written Opinion issued in international application No. PCT/EP2009/063452, mailed Jan. 18, 2010 (8 pages).
International Preliminary Report on Patentability issued in international application No. PCT/EP2009/063452, dated Feb. 7, 2011 (11 pages).
U.S. Appl. No. 13/132,870, filed Jul. 5, 2011, entitled "Automated Multi-Group Transmission of a Motor Vehicle and Method for Operating an Automated Multi-Group Transmission" (26 pages).

* cited by examiner

*Primary Examiner* — Justin Holmes
*Assistant Examiner* — Jacob S Scott
(74) *Attorney, Agent, or Firm* — Brinks Gilson & Lione

(57) ABSTRACT

A split-axis transmission may include two planetary gear sets to provide two parallel torque paths from an input axis to an output axis. Thus, the split-axis transmission may provide the ratio preselection capability and the low power losses of a dual-clutch transmission, while also providing the ratio-changing control and smoothness of a traditional powershift automatic transmission.

19 Claims, 14 Drawing Sheets

SPLIT AXIS TRANSMISSION ARCHITECTURE

BACKGROUND OF THE INVENTION

1. Field of the Invention

The invention relates to transmissions. In particular, the invention relates to split-axis transmissions for vehicles.

2. Related Art

Transmissions provide varying torque ratios between engines or motors and the drive axles to provide efficiency and higher performance in vehicles. Manual transmissions require the operator to recognize when a change in torque ratio would be beneficial, and then to shift elements of the transmission to effect a ratio change. Manual operation of transmissions may be cumbersome to some operators. Further, power is lost during the time that the engine or motor is disengaged while the transmission elements are shifted to effect the next desire ratio. To address these issues, several improvements have been made on the manual transmissions traditionally used in vehicles. For example, the automatic mechanical transmission was developed to automatically determine when a shift was necessary, and then to shift the transmission elements to achieve a desired torque ratio. However, the automatic mechanical transmission, like the manual transmission, suffers from torque interruption during shifting: the transmission must first shift into neutral (i.e., disengage the engine drive torque from the transmission) before changing the gear ratio.

The powershift automatic transmission is an improvement over automatic mechanical transmissions in that it does not require a decoupling of torque during the ratio change. The powershift transmission provides an overlap of ratios during the ratio change so that both the shift time and the disturbance in power is minimized. Nonetheless, powershift automatic transmissions still suffer from power losses associated with released multi-plate clutches and pumping losses for lubrication and clutch actuation flow.

The dual-clutch transmission reduces the overall ratio changing time, since an overlap can be performed during the shift, which results in less disturbance of torque during a shift. Dual clutches installed between the transmission input and output provide a means to operate parallel torque shafts. A controller preselects the next gear using, for example, a predictive algorithm that considers the current gear ratio, acceleration, speed, or other variables. When the transmission shifts to the next gear ratio, one clutch disengages the transmission from the current gear while the other clutch engages the transmission in the target gear. Thus, power flows almost constantly from the drive mechanism to the wheels of the vehicle. The shift quality of the dual-clutch transmission can theoretically match that of a powershift automatic transmission. Dual-clutch transmissions have the advantage of eliminating the multi-plate clutches used in a powershift automatic, and by using a much smaller oil pump. These two changes provide reductions in parasitic losses. Further enhancements in efficiency may be gained with a dual-dry clutch, which eliminates the need for a torque converter. However, the shift quality and driveability may be reduced as a result. Another disadvantage of eliminating the torque converter is the loss of torque multiplication associated with the device.

Major disadvantages of dual-clutch transmissions are cost, launch consistency, and complexity of control strategy. Dual-clutch transmissions are able to preselect only one gear ratio at a time. If the transmission incorrectly predicts the next gear ratio, then excessive delays in the shift event may occur, and the transmission may be forced to remain in neutral for an extended period of time. This results in power loss and a degraded driving experience.

Thus, there is a need for a highly efficient, cost-effective transmission with improved capabilities for preselecting a target gear and for minimizing torque interruption during a gear change.

SUMMARY OF THE INVENTION

The descriptions below include apparatuses for transmitting torque from an input axis to an output axis at different gear ratios. A split-axis transmission may include two planetary gear sets to provide two parallel torque paths from an input axis to an output axis. Thus, the split-axis transmission may provide improved capabilities for preselecting a target gear and minimal torque interruption during a gear change.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The embodiments described below may be more fully understood by reading the following description in conjunction with the drawings, in which.

DETAILED DESCRIPTION

Figure 1:
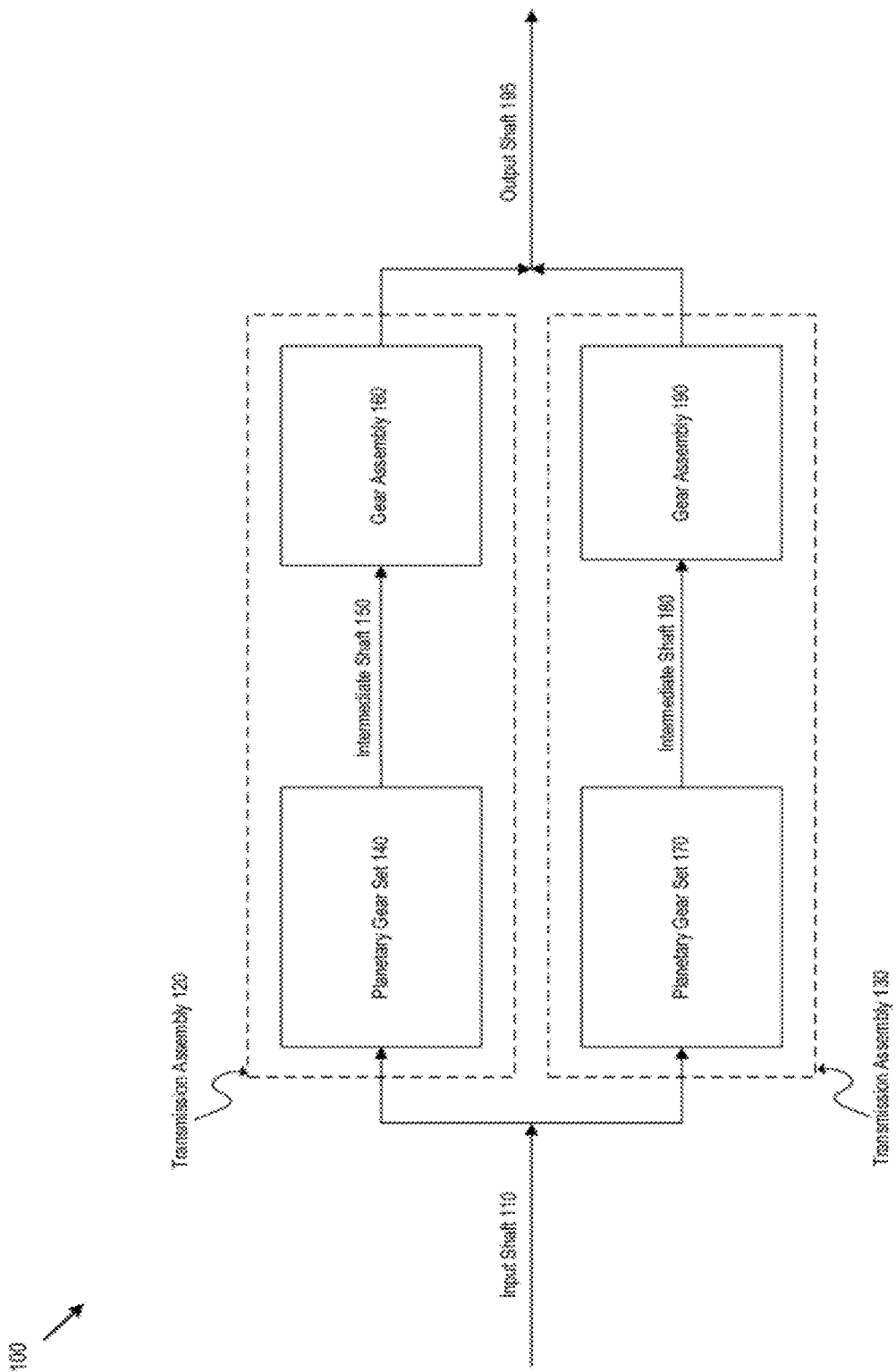
FIG. 1 is a block diagram of a split-axis transmission according to one embodiment of the invention.

FIG. 1 shows a block diagram of a split-axis transmission 100, including an input shaft 110 and an output shaft 195, according to another embodiment of the invention. The transmission 100 includes two transmission assemblies 120, 130 that define alternative torque paths between the input shaft 110 and the output shaft 195. Alternatively, the transmission may include transmission assemblies in excess of two to provide additional parallel torque paths. Each of the transmission assemblies includes a planetary gear set 140, 170, an intermediate shaft 150, 180, and a gear assembly 160, 190. Generally, only one of the transmission assemblies 120, 130 will be engaged at any given time. The planetary gear sets 140 or 170 control engagement of transmission assemblies 120 or 130 to provide for torque flow from the input shaft 110 to the output shaft 195 at a particular gear ratio. For example, planetary gear set 140 may engage transmission assembly 120 to transmit torque from the input shaft 110 to the output shaft 195, while planetary gear set 170 disengages to prevent torque flow through transmission assembly 130, and vice versa.

The two transmission assemblies may provide for different sets of transmission gear ratios. For example, one transmission assembly 120 may provide the odd-numbered gears, and the other transmission assembly 130 may provide the even-numbered gears. During a typical gear shift from a current gear ratio to a target gear ratio, one of the planetary gear sets 140 or 170 disengages the transmission assembly 120 or 130 that is responsible for the current ratio, while the other planetary gear set 140 or 170 simultaneously engages the transmission assembly 120 or 130 that is responsible for the target ratio. This process reduces the disruption of torque transfer from the input shaft 110 to the output shaft 195 during a gear change.

Torque is provided to input shaft 110 by a drive mechanism, for example, an internal combustion engine or an electric motor (not shown). Torque may be disconnected from the drive mechanism by a launch device (not shown). The launch device may be a torque converter, dry clutch, wet clutch, or any other type of launch device. The preferred input device is a torque converter due to the damping that is provided.

When the launch device is closed, torque flows along the input shaft 110 through either transmission assembly 120 or transmission assembly 130 depending on which ratio is desired. A planetary gear set may be used to de-couple a non-driven intermediate shaft. In theory, a continuous variable transmission ("CVT") element could be used as a launch device. However, a CVT may result in limiting the torque capacity of the transmission. Where a CVT element could provide sufficient torque capacity, then only the CVT mechanism may be needed in the first place.

In FIG. 1, planetary gear set 140 may be used to de-couple intermediate shaft 150, while planetary gear sets 170 may be used to de-couple intermediate shaft 180. Planetary gear set 140 and 170 may be controlled to selectively transmit torque from the input shaft 110 to the output shaft 195 by releasing the one planetary gear set while engaging the other. In this way, the transmission may advantageously utilize planetary gear sets to provide parallel torque paths. The launch device does not need to release during ratio changes because the planetary gear sets may include friction elements operable to de-couple torque from the input shaft 110 to either of the intermediate shafts 150 and 180. Thus, a wet clutch may be used as a launch device, thereby providing a cost effective solution and would not have the thermal issues associated with a dry input clutch during stop-and-go driving.

Preferably, planetary gear sets 140 and 170 engage transmission assemblies 120 and 130 one at a time. Referring to FIG. 1, for example, while planetary gear set 140 is configured to transmit torque from input shaft 110 to intermediate shaft 150, planetary gear set 170 is configured to de-couple input shaft 110 from intermediate shaft 180.

A split-axis transmission may provide for preselection of gear ratios. For example, when transmission assembly 120 is engaged, the next expected ratio may be preselected in transmission assembly 130 in preparation for the next ratio change. Preselection may involve the process of first predicting the next desired ratio, and then altering the configuration of the disengaged transmission assembly 120 or 130 to provide for the next ratio by moving components into place before the actual shift to the next ratio occurs. In FIG. 1, when torque is flowing through transmission assembly 120, the planetary gear set 170 de-couples the transmission assembly 130 from the input shaft 110. In this state, the transmission assembly may be configured to provide the next ratio as predicted by the transmission. This preselection mechanism provides the benefit of efficient, smooth gear changes because the transmission does not have to shift into neutral by disconnecting the input shaft 110 from the drive mechanism by use of the launch device. Instead, the launch device may remain engaged such that torque flows from the drive mechanism to the input shaft 110.

The planetary gear sets 140, 170 enable the transmission 100 to preselect two gear ratios simultaneously. This is because each of the planetary gear sets 140, 170 may be engaged at either of two different ratios, as explained in more detail below. As a result, the transmission 100 may simultaneously preselect two different gear ratios in the same transmission assembly 120 or 130 and preserve the option to engage either of the two preselected gear ratios when the gear change is initiated.

Two types of preselection may be implemented in a split-axis transmission: concurrent preselection and distinct preselection. Concurrent preselection provides for simultaneous preselection of the next potential upshift gear ratio and the next potential downshift gear ratio. For example, when a concurrent preselection transmission is operating in third gear, the disengaged transmission assembly may preselect both second gear and fourth gear. A distinct preselection transmission provides for the preselection of two distinct gear ratios that are not necessarily concurrent with the current gear ratio. For example, when a distinct preselection transmission is operating in first gear, the disengaged transmission assembly may preselect both second gear and sixth gear.

By way of further example, if transmission assembly 120 is engaged in first gear, second gear may be preselected in transmission assembly 130 by actuating the various components of transmission assembly 120. During the upshift from first to second gear, transmission assembly 120 is disengaged while transmission assembly 130 is simultaneously engaged to transmit torque from input shaft 110 to output shaft 195. Gear assemblies 160 and 190 may include a variety of gear types such as spur gears, bevel gears, worm gears, hypoid gears, planetary gears, herringbone gears, and helical gears. The use of helical gears may be advantageous because of their high efficiency and low noise. To minimize parasitic power losses without impacting shift quality or vehicle driveability, transmission 100 may also use a minimal number of friction elements to control gear ratios, and may rely upon the use of dog type clutches and bands.

Figure 2:
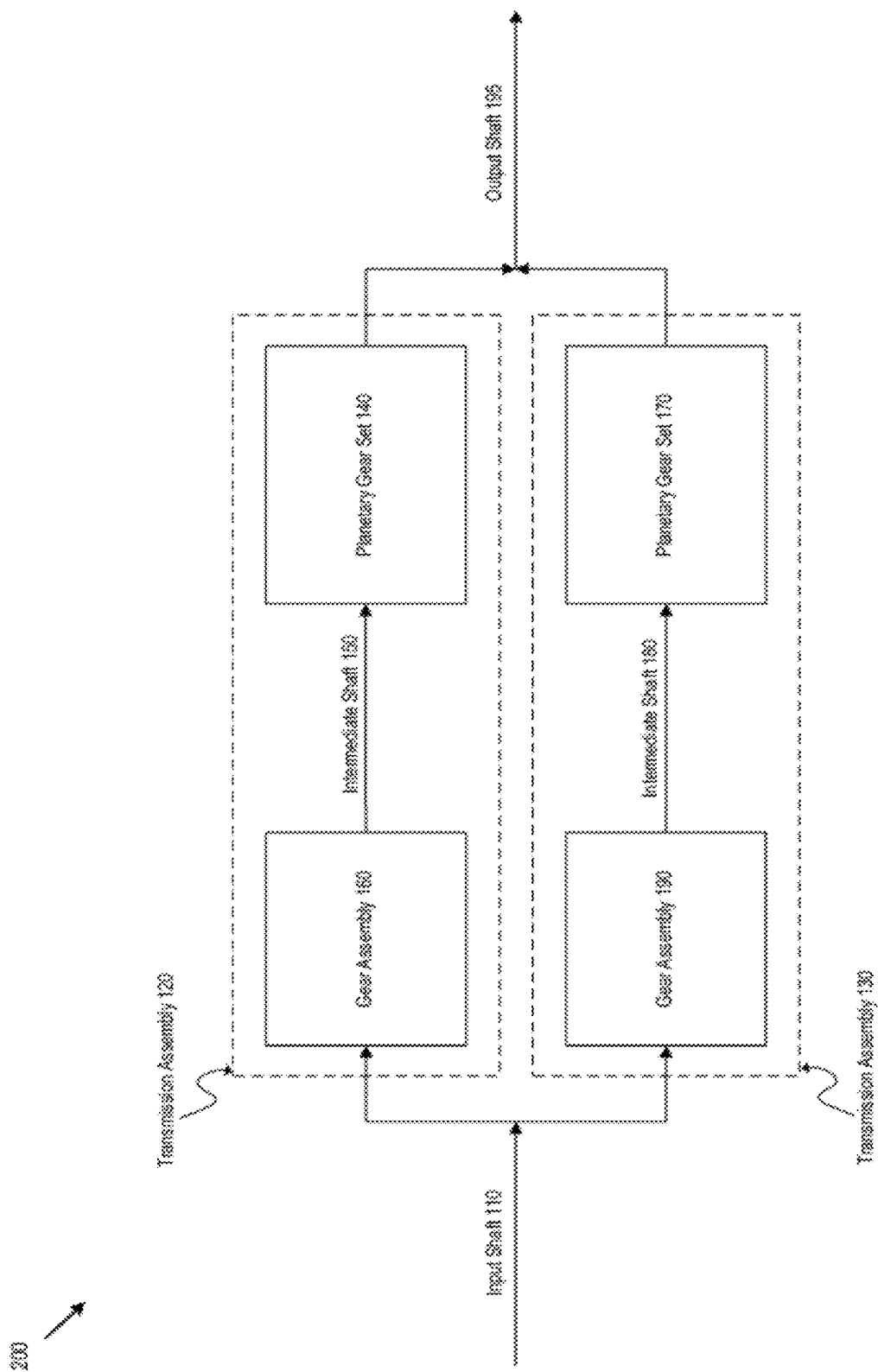
FIG. 2 is a block diagram of a split-axis transmission according to another embodiment of the invention.

FIG. 2 depicts a split-axis transmission 200 according to another embodiment of the invention. In transmission 200 of FIG. 2, the planetary gear sets 140, 170 are located at the output of transmission assemblies 120 and 130. Locating the planetary gear sets 140, 170 at the input side may minimize costs because the planetary gear sets 140, 170 may transmit relatively lower torque levels in such a configuration, and may provide more consistent differential speeds across the ratio changing elements. On the other hand, locating the planetary gear sets 140, 170 at the output side may be beneficial in certain applications.

Figure 3:
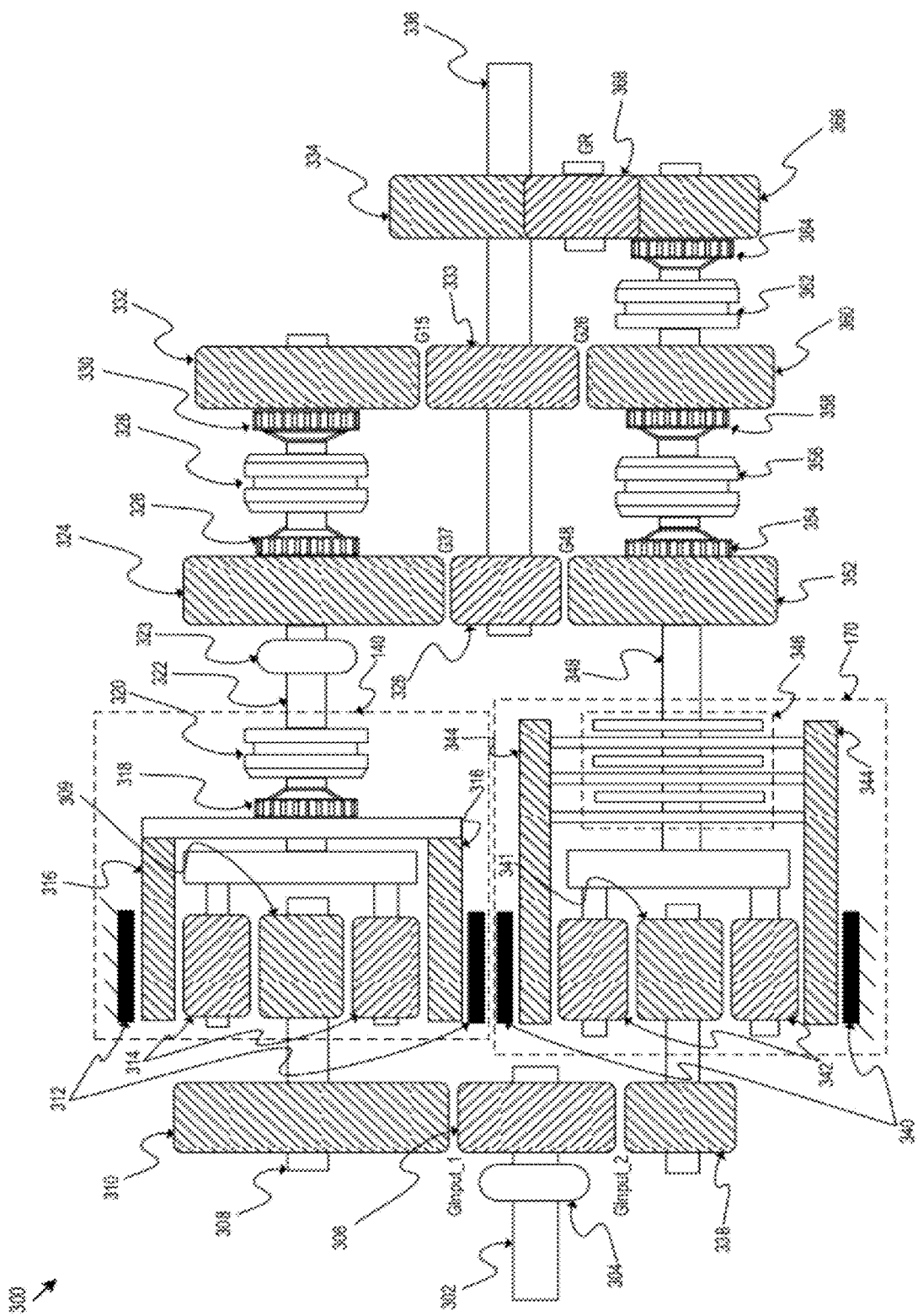
FIG. 3 is a mechanical illustration of a distinct preselection split-axis transmission according to another embodiment of the invention.

FIG. 3 shows a mechanical implementation of a split-axis transmission according to another embodiment of the invention. Transmission 300 includes input shaft 302, planetary gear sets 140 and 170, intermediate shafts 322 and 348, and gears 324, 332, 352, 360 and 366 used to transmit torque to output shaft 336. Gear ratios are determined by actuating band brakes 312 and 340, clutches 318, 346, 326, 330, 354, 358, and 364, and synchronizers 320, 328, 356, and 362. Gears 326 and 333 are meshed with gears 324, 332, 352, and 360. Gear 334 is meshed with intermediate gear 368, which is meshed with gear 366 to provide the reverse ratio. Planetary gear sets 140 and 170 include primarily ring gears 316 and 344, planet gears 314 and 342, and sun gears 309 and 341, respectively.

Each of the gears may operate in constant mesh in transmission 300. Torque is input to an input shaft 302 from a drive mechanism via a launch device. Optionally, pump 304 may be driven by the input shaft 302 and used to create hydraulic pressure for control of the various clutches and components. Gear 306 is attached to and driven by input shaft 302. Gear 306 is in constant mesh with gear 310 and gear 338. Depending on the state of band brake 312 and band brake 340, torque may flow to gear 310 or gear 338. If band brake 312 is engaged to lock ring gear 316 to ground, i.e., is configured to prevent ring gear 316 from rotating, then gear 310 will turn shaft 308, which causes sun gear 309 to turn. Due to the engagement of band brake 312, planet gears 314 will turn due to the rotation of sun gear 309. Notably, sun gears 309 and 341 are rotating if input shaft 302 is rotating. However, power will not flow through the planetary gear set unless either the brake band 312 or 340 is applied, or unless either clutch 320 or 346 is applied. In such a configuration, planetary gear set 140 is configured to couple and potentially increase torque from the input shaft 302 to intermediate shaft 322. In a preferred embodiment, planetary gear set 170 would be configured to de-couple torque from the input shaft 302 to intermediate shaft 348 while planetary gear set 140 is configured to couple torque from the input shaft 302 to intermediate shaft 322.

Depending on the position of synchronizer 328, torque flows to output shaft 336 via gears 324 and 326 or gears 332 and 333. If synchronizer 328 is engaged with dog clutch 326, then torque would flow to output shaft 336 through gears 324 and 326. In this case, a ratio corresponding with a third gear would be realized for the transmission in FIG. 3. This is shown in FIG. 3 by the text "G37," which indicates that in third and seventh gear, torque flows through gears 324 and 326. FIG. 3 includes other annotations of ratio pairings beginning with the prefix "G."

If, on the other hand, band brake 312 is disengaged, i.e., open, then the input shaft 302 is de-coupled from intermediate shaft 322 by planetary gear set 140. Engaging band brake 340 causes torque to flow from input shaft 302 through gears 306 and 338. In turn, this causes sun gear 341 to rotate, further causing planet gears 342 to rotate when clutch 346 is open. Ultimately, a configuration in which clutch 346 is open and band brake 340 engaged, such that ring gear 344 is grounded, couples input shaft 302 to intermediate shaft 348. Torque thereby transmits through one of three selected gear pairings to output shaft 336. If synchronizer 356 is engaged with dog clutch 354, then torque flows through gears 352 and 326. If synchronizer 356 is engaged with dog clutch 358, then torque flows through gears 360 and 333.

Preferably, only one of planetary gear sets 140 and 170 is engaged to couple torque at any given time. A binding condition, which is generally undesirable, may occur if both planetary gear sets 140 and 170 are configured to couple torque from input shaft 302 to intermediate shafts 322 and 348 and synchronizers 328, 356, and 362 are configured such that torque is coupled from intermediate shafts 322 and 348 to output shaft 336.

The split-axis transmission of FIG. 3 provides for eight ratios for driving output shaft 336 in one direction, preferably to motivate a vehicle in a forward direction, and two ratios for driving output shaft 336 in an opposite direction, preferably to motivate a vehicle in a reverse direction. Each gear interface provides a torque multiplication. A desired ratio is selected using the following components: band brakes 312 and 340, synchronizers 320, 328, 356, and 362, and clutch 346. Clutch 346 may be a multi-plate clutch, as shown in FIG. 3, used to enhance shift quality. Clutch 346 may also be a wet or dry friction clutch, or may be replaced with a dog clutch and synchronizer similar to that used in planetary gear set 140.

In FIG. 3, the odd-numbered gear ratios, e.g., first, third, fifth, and seventh, are implemented by engaging planetary gear set 140 and transmitting torque via intermediate shaft 322, while the even numbered gear ratios, e.g., second, fourth, sixth, and eighth, as well as reverse, are implemented by engaging planetary gear set 170 and transmitting torque via intermediate shaft 348. Such a configuration in which odd ratios are located on a first shaft and even ratios are located on a second shaft may be advantageous because gear ratios may be preselected on an unengaged shaft while the other shaft is transmitting torque.

The torque ratio configuration in FIG. 3 is a distinct preselection configuration. Each of the upper ratios (fifth to eighth gear) is based on one of the two planetary gear sets 140 and 170 operating at a torque ratio of 1:1. The total torque ratio from input shaft 302 to output shaft 336 is further dependent on gears 306, 310, and 338, and on the selection and engagement of one of gears 324, 332, 352, 360, and 366, meshed with gears 326, 333, or 334. The lower ratios (first to fourth gear) are based on planetary gear sets 140 and 170 operating at a torque ratio of, for example, 3.00:1. The total torque ratio from input shaft 302 to output shaft 336 is again further dependent on gears 306, 310, and 338, and on the selection and engagement of one of gears 324, 332, 352, 360, and 366, meshed with gears 326, 333, or 334. Using a planetary gear set to provide, for example, two ratios per gear pairing may provide the additional advantage of reducing losses due to tooth sliding because fewer gears are necessary to provide a given number of ratios.

Figure 4:
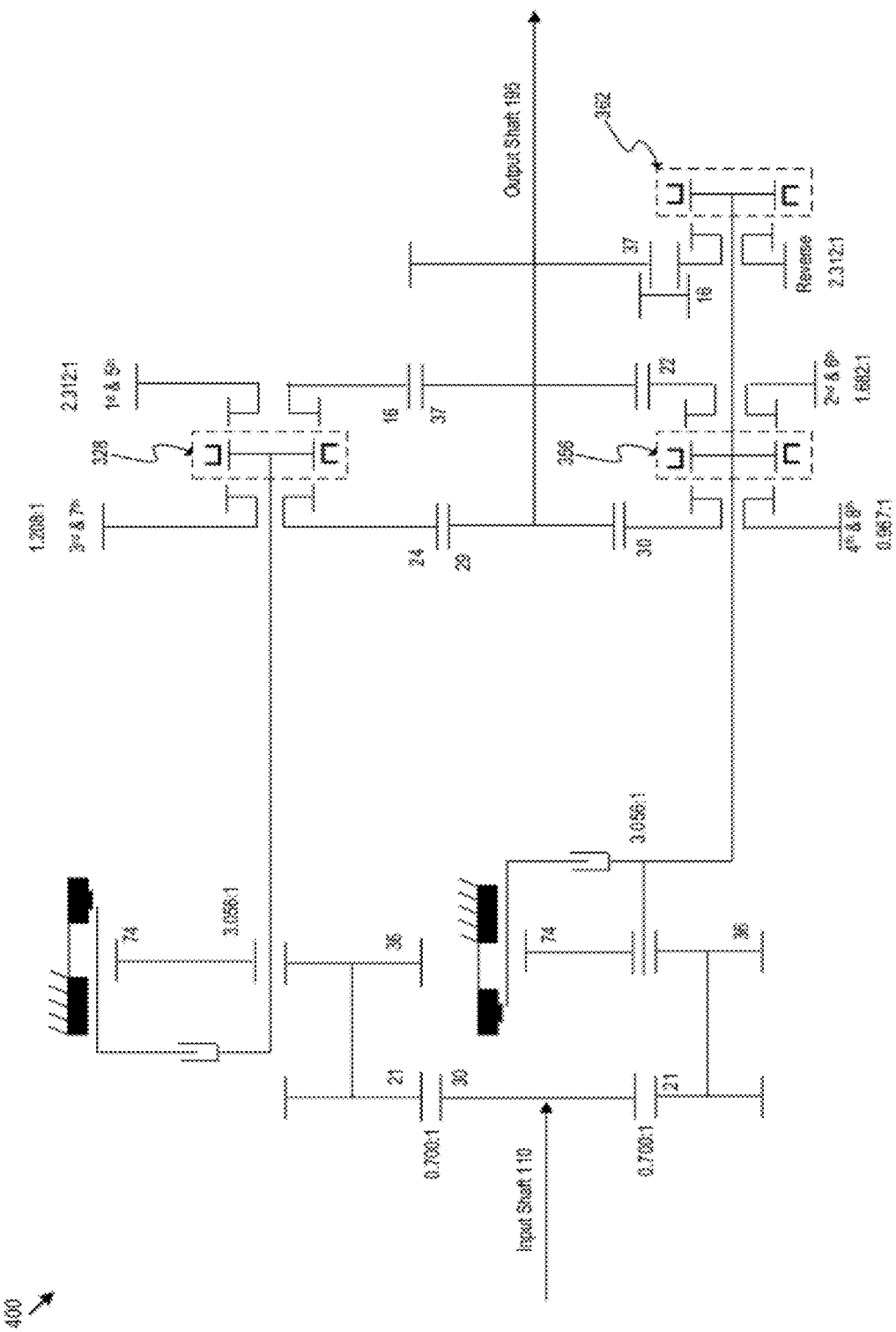
FIG. 4 is a schematic diagram of a distinct preselection split-axis transmission according to another embodiment of the invention.

FIG. 4 shows a schematic diagram of a split-axis transmission employing concurrent preselection according to another embodiment of the invention. FIG. 4 includes the number of teeth for each gear directly above or below the short horizontal lines representing gear meshes. In some instances, the gear ratio is also indicated in FIG. 4, for example, as 0.700:1.

Designing to achieve a geometric transmission gear ratio progression naturally results in a cost-optimal design because the planetary ratio for both the odd and even axis typically would be the same for a given progression curve. Thus, a single planetary gear set design may be used in both of the two parallel transmission assemblies. The input ratio and individual gear ratios are also well defined, and are based on the high (top gear) ratios in the case where the planetary ratio is 1:1 in the top gears. Nonetheless, some applications may benefit from having planetary gear sets with different ratios; the split-axis transmission does not require two planetary gear sets having equal ratios.

The applied elements for the distinct ratio preselection are shown in Table 1 for the distinct split-axis transmission in FIG. 3. Note that synchronizers 328, 356, and 362 may be used for preselection of the ratios, and therefore, may not actively control the torque flow while shifting.

TABLE 1

Active Elements in Each Gear for the Split-Axis Transmission in FIG. 3

| Gear Ratio | Active Element in FIG. 3 | | | | | |
|---|---|---|---|---|---|---|
| | 312 | 340 | 328 | 356 | 320 | 346 | 362 |
| First | X | | X | | | | |
| Second | | X | | X | | | |
| Third | X | | X | | | | |
| Fourth | | X | | X | | | |
| Fifth | | | X | | X | | |
| Sixth | | | | X | | X | |
| Seventh | | | X | | X | | |
| Eighth | | | | X | | X | |
| Reverse, High | | | | | | X | X |
| Reverse, Low | | X | | | | | X |

Figure 6:
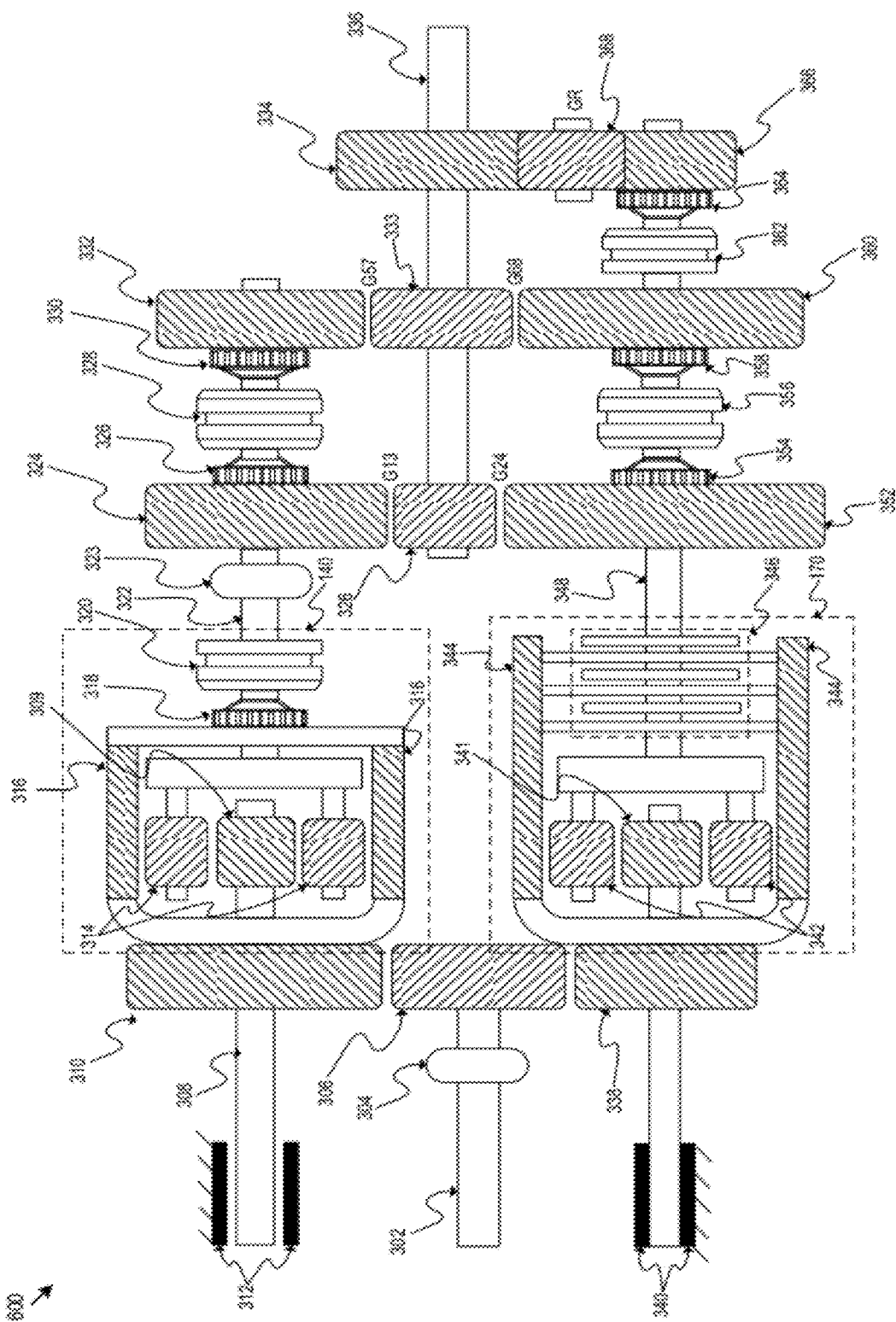
FIG. 6 is a mechanical illustration of a concurrent preselection split axis transmission according to another embodiment of the invention.

The main contributor to viscous losses in the transmission 300 is clutch 346 when a multi-plate clutch is used as shown in FIGS. 3 and 6. Therefore, it is to be expected that slightly higher parasitic losses will be present in first through fifth gear, and in seventh gear. Overall, this configuration may be more efficient than the concurrent preselection arrangement because the transmission will likely operate with clutch 346 applied more frequently. It should be noted that transmissions 300 and 600 may have only a single multi-plate clutch, so the overall efficiency will be extremely high.

The ratio determination for the discrete ratio arrangement is based on the following set of equations:

$$Gear_1 = Ratio_{GInput\_1} \cdot Ratio_{G15} \cdot Ratio_{Planetary\_1} \quad \text{Eq. 1}$$

$$Gear_2 = Ratio_{GInput\_2} \cdot Ratio_{G26} \cdot Ratio_{Planetary\_2} \quad \text{Eq. 2}$$

$$Gear_3 = Ratio_{GInput\_1} \cdot Ratio_{G37} \cdot Ratio_{Planetary\_1} \quad \text{Eq. 3}$$

$$Gear_4 = Ratio_{GInput\_2} \cdot Ratio_{G48} \cdot Ratio_{Planetary\_2} \quad \text{Eq. 4}$$

$$Gear_5 = Ratio_{GInput\_1} \cdot Ratio_{G15} \cdot Ratio_{Planetary\_1 \, (1:1 \, Planetary \, ratio)} \quad \text{Eq. 5}$$

$$Gear_6 = Ratio_{GInput\_2} \cdot Ratio_{G26} \cdot Ratio_{Planetary\_2 \, (1:1 \, Planetary \, ratio)} \quad \text{Eq. 6}$$

$$Gear_7 = Ratio_{GInput\_1} \cdot Ratio_{G37} \cdot Ratio_{Planetary\_1 \, (1:1 \, Planetary \, ratio)} \quad \text{Eq. 7}$$

$$Gear_8 = Ratio_{GInput\_2} \cdot Ratio_{G48} \cdot Ratio_{Planetary\_2 \, (1:1 \, Planetary \, ratio)} \quad \text{Eq. 8}$$

$$Reverse_{Low} = Ratio_{input\_2} \cdot Ratio_{Reverse} \cdot Ratio_{Planetary\_2} \quad \text{Eq. 9}$$

$$Reverse_{High} = Ratio_{input\_2} \cdot Ratio_{Reverse} \cdot Ratio_{Planetary\_2 \, (1:1 \, Planetary \, ratio)} \quad \text{Eq. 10}$$

As shown by Equations 1 through 8, the planetary gear set provides a torque multiplication when in the lower ratios (i.e., first to fourth gear), and is locked in a 1:1 torque ratio for the higher ratios. The variable "$Ratio_{Planetary\_1}$" represents the torque multiplier of planetary gear set 140 when band brake 312 is actuated and synchronizer 320 has not engaged dog clutch 318. The variable "$Ratio_{Planetary\_2}$" represents the torque multiplier of planetary gear set 170 when band brake 340 is actuated and clutch 346 is not actuated. This provides a simple method of determining a set of ratios for each of the helical gears, along with the torque multiplication of the planetary gear set.

Figure 5:
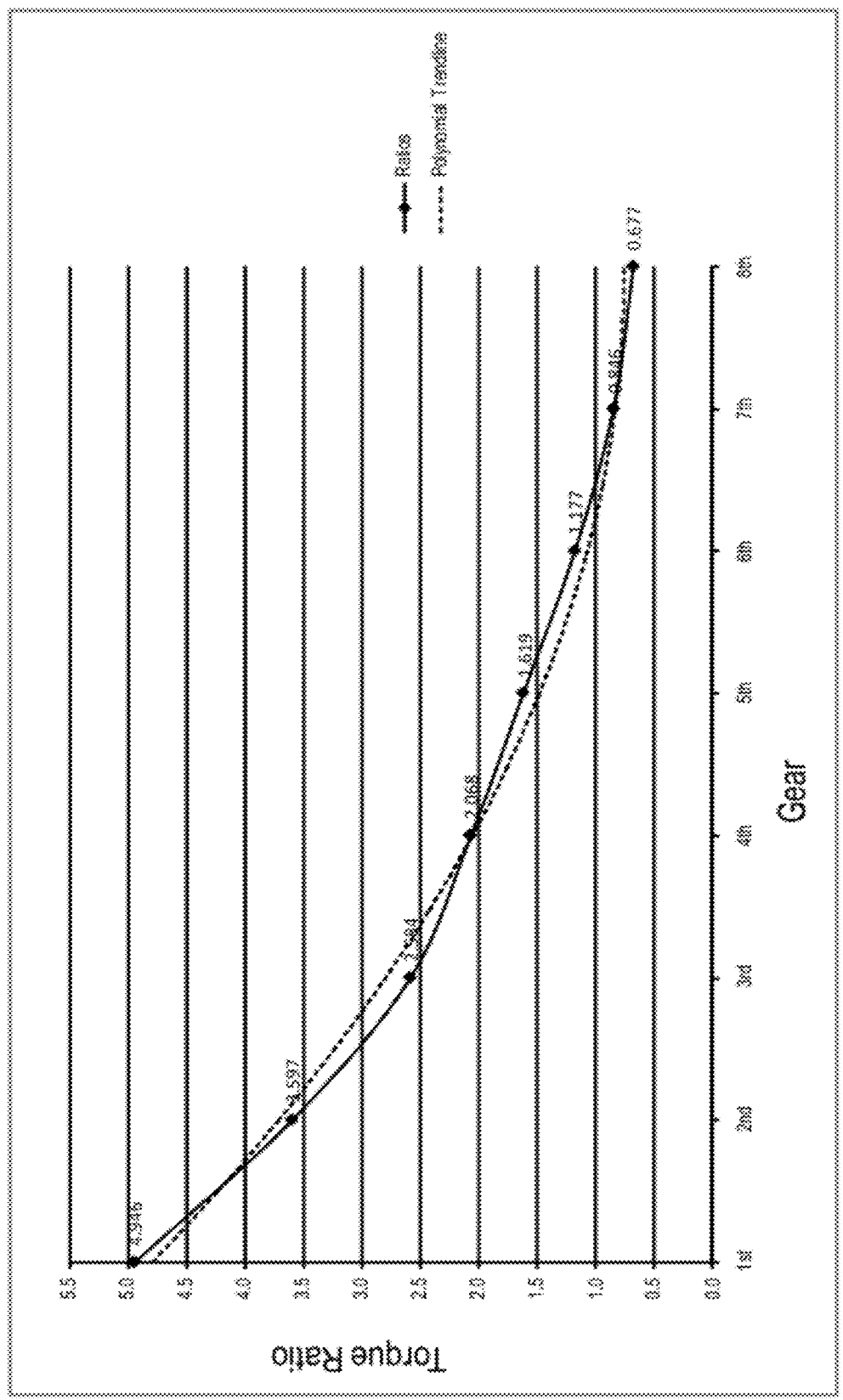
FIG. 5 is a plot of the gear ratios of a distinct preselection split-axis transmission according to another embodiment of the invention.

FIG. 5 shows a plot of the gear ratios of the distinct preselection split-axis transmission in FIG. 3 according to another embodiment of the invention.

A further benefit of the distinct ratio selection of transmission 300 is that band brakes 312 and 340 are used for the lower ratios and clutch 346 is used for the higher ratios, which further enhances shift quality. The disadvantage of this arrangement is that it requires more reliable preselection control. If the preselection logic does not accurately determine the next ratio, a delay may result. FIG. 5 depicts the ratio steps that are a result of the gear teeth count shown in FIG. 4 as calculated using Equations 1 through 10.

If an under-drive ratio is used, then the ratio step between first and second gear may be decreased so that during normal operation the shift from first to second gear has less shift disturbance and the ratio spread is increased.

The controlling components for changing the torque ratio (e.g., band brakes 312 and 340, synchronizers 320, 328, 356, and 362, and clutch 346) may be actuated either electrically or hydraulically which makes the system particularly useful for hybrid applications where a given type of power is predominate. In electrically actuated systems, the transmission would only need oil for lubrication, and either a mechanically driven or electrically driven oil pump could be used to pressurize the lubrication circuits. Alternatively, lubrication may occur as the lubricant is moved by the gears that are in contact with the lubricant.

Using a multi-plate clutch to lock planetary gear set 170 at a 1:1 torque ratio for the even ratio axis allows for more consistent shifting. In this embodiment, the overall impact on efficiency may be minimal relative to a typical powershift automatic transmission because only one multi-plate clutch is used. The multi-plate clutch may receive lubrication in the traditional manner. Further reductions in windage losses, for example, may be achieved by using a dry sump lubrication system, and using jets for lubrication of the gears and bearings. Rotating losses are minimal because fewer seals and bushings may be needed for channeling fluid to multi-plate clutches.

For a parking mechanism, synchronizers 356 and 362 may engage dog clutches 354 and 364 to effectively lock output shaft 336. Alternatively, a traditional parking pawl and gear may be incorporated when split-axis transmission 300 is used in commercial applications where GVW loads exceed the limit of dog clutches 354 and 364.

FIG. 6 depicts a concurrent split-axis transmission 600 according to another embodiment of the invention. Transmission 600 provides for concurrent preselection of both the potential next upshift ratio and the potential next downshift ratio. This configuration is advantageous because transmission 600 may more effectively react to changing variables that are used by a transmission controller (not shown) to determine the next gear. For example, input may come from the vehicle operator's depression of the accelerator pedal. The transmission controller may receive a signal indicating that the accelerator is being depressed and correspondingly may preselect the next upshift and downshift gear ratios. If the operator suddenly increases the accelerator pedal angle, transmission 600 may quickly and efficiently execute a downshift because the potential next downshift gear ratio is already preselected. Thus, transmission 600 may quickly and efficiently react, whereas a transmission lacking a concurrent preselection configuration may falter under such conditions and be forced to shift into neutral for a period of time cognizable by the vehicle operator.

In FIG. 6, the torque transfer during the ratio change is carried by the friction elements controlling the ratio, which include band brake 312 and synchronizer 320 of planetary gear set 140, and band brake 340 and clutch 346 of planetary gear set 170. The result is more consistent shift quality due to using the same elements for every ratio change, and less power losses since there is a minimum of power absorbing friction elements. The type of friction element used on the planetary gear set is not limited to the configuration shown in FIG. 6. This configuration is based on the goal of maintaining acceptable shift quality during a ratio change. But any given element, for example, a dog-clutch, a dry clutch, or a wet multi-plate clutch, may be used to control the planetary ratio change. The configuration may be expandable with regard to torque capacity and may use traditional transmission components and sensors, which improves the manufacturability of the system.

Transmission 600 may be calibrated to shift gears based on vehicle speed. The vehicle speed at which a shift between two ratios is known as a shift point. For example, the 1-2 shift point of transmission 600, i.e., the speed at which transmission 600 will shift from first to second gear, may be 15 km/hr.

For the split-axis transmission in FIG. 6, first gear is unique in that there are two available options for preselection: second gear and reverse. If the shift point calibration is set such that the 1-2 shift vehicle speed is above the maximum speed to engage reverse, then preselection on the even axis may be simplified.

Another advantage of transmission 600 is that two reverse gears are available. If the reverse ratio is matched to the first gear, then the reverse 'high' ratio will be approximately equal to the third gear ratio. This is made possible by the two operating ratios of the planetary gear set corresponding to the gears used to implement reverse gear.

When the vehicle is at low speed, engaging synchronizer 362 and dog clutch 364 may preselect reverse gear. Reverse gear may remain preselected until either a speed or a speed rate threshold is crossed. For example, transmission 600 may be configured such that the maximum speed for engaging reverse is 10 km/hr and that the upshift from first to second gear occurs at approximately 15 km/hr. In this example, during low acceleration, the reverse gear may remain preselected until the vehicle speed reaches 10 km/hr, and then synchronizer 356 may preselect second gear by engaging dog clutch 354. During high acceleration, the crossing of these thresholds may also take into account the speed derivative.

As the speed approaches 15 km/hr, brake band 340 may actuate. To simplify the ratio change, one-way clutch 323 may be used to eliminate the need for precise release of brake band 312. This type of wash-out control is not necessary for the application of this system; it is proposed as a simple method to maintain consistent shift quality.

Once second gear is engaged, brake band 312 may fully release. At this point, there may be no need to change the preselection because the next ratio after second gear typically would be either first or third gear, which is already preselected.

When the system is ready to perform a shift from second gear to third gear, synchronizer 320 may engage dog clutch 318, and band brake 340 may be released. If instead of an upshift, a downshift is requested, brake band 312 may be re-applied. The transition may be supported by one-way clutch 323, which may minimize the requirement for precise band-to-band control timing.

FIG. 6 depicts a concurrent preselection split-axis transmission, which is the currently preferred configuration because both the upshift and downshift ratios may be selected concurrently. This concurrent capability eases the preselection logic because there are two concurrent ratios selected, e.g., first and third gear, as opposed to two distinct ratios, e.g., first and fifth gear. The planetary gear set arrangement for this architecture is different from the planetary gear set arrangement for the distinct preselection architecture because the torque multiplication of the planetary gear set is lower for this arrangement.

The applied elements for concurrent ratio preselection are shown in Table 2 for transmission 600. Note that synchronizers 328, 356, and 362 may be used for preselection of the ratios, and therefore, may not actively control the torque flow while shifting.

TABLE 2

Active Elements in Each Gear for the Split-Axis Transmission in FIG. 6

| Gear Ratio | Active Element in FIG. 6 | | | | | | |
|---|---|---|---|---|---|---|---|
| | 312 | 340 | 328 | 356 | 320 | 346 | 362 |
| First | X | | X | | | | |
| Second | | X | | X | | | |
| Third | | | X | | X | | |
| Fourth | | | | X | | X | |
| Fifth | X | | X | | | | |
| Sixth | | X | | X | | | |
| Seventh | | | X | | X | | |
| Eighth | | | | X | | X | |
| Reverse, High | | | | | | X | X |
| Reverse, Low | | X | | | | | X |

The main contributor of parasitic viscous losses in transmissions 300 and 600 typically is clutch 346 when a multi-plate clutch is used for clutch 346. In the concurrent preselection arrangement 600, clutch 346 may not be actuated in three of the top gear ratios. Therefore, it should be expected that the viscous losses may be higher in first through third gears, and fifth through seventh gears. Since only one multi-plate clutch is used, the contribution to parasitic losses typically will be small.

The ratio determination for the concurrent preselect arrangement is based on Equations 11 through 20:

$$\text{Gear}_1 = \text{Ratio}_{GInput\_1} \cdot \text{Ratio}_{G13} \cdot \text{Ratio}_{Planetary\_1} \quad \text{Eq. 11}$$

$$\text{Gear}_2 = \text{Ratio}_{GInput\_2} \cdot \text{Ratio}_{G24} \cdot \text{Ratio}_{Planetary\_2} \quad \text{Eq. 12}$$

$$\text{Gear}_3 = \text{Ratio}_{GInput\_1} \cdot \text{Ratio}_{G13} \cdot \text{Ratio}_{Planetary\_1 \, (1:1 \, Planetary \, ratio)} \quad \text{Eq. 13}$$

$$\text{Gear}_4 = \text{Ratio}_{GInput\_2} \cdot \text{Ratio}_{G24} \cdot \text{Ratio}_{Planetary\_2 \, (1:1 \, Planetary \, ratio)} \quad \text{Eq. 14}$$

$$\text{Gear}_5 = \text{Ratio}_{GInput\_1} \cdot \text{Ratio}_{G57} \cdot \text{Ratio}_{Planetary\_1} \quad \text{Eq. 15}$$

$$\text{Gear}_6 = \text{Ratio}_{GInput\_2} \cdot \text{Ratio}_{G68} \cdot \text{Ratio}_{Planetary\_2} \quad \text{Eq. 16}$$

$$\text{Gear}_7 = \text{Ratio}_{GInput\_1} \cdot \text{Ratio}_{G57} \cdot \text{Ratio}_{Planetary\_1 \, (1:1 \, Planetary \, ratio)} \quad \text{Eq. 17}$$

$$\text{Gear}_8 = \text{Ratio}_{GInput\_2} \cdot \text{Ratio}_{G68} \cdot \text{Ratio}_{Planetary\_2 \, (1:1 \, Planetary \, ratio)} \quad \text{Eq. 18}$$

$$\text{Gear}_{Low} = \text{Ratio}_{GInput\_2} \cdot \text{Ratio}_{Reverse} \cdot \text{Ratio}_{Planetary\_2} \quad \text{Eq. 19}$$

$$\text{Gear}_{High} = \text{Ratio}_{GInput\_2} \cdot \text{Ratio}_{Reverse} \cdot \text{Ratio}_{Planetary\_2 \, (1:1 \, Planetary \, ratio)} \quad \text{Eq. 20}$$

For this arrangement, the planetary ratio multiplies torque in first, second, fifth, and sixth gears. This makes the ratio steps more difficult to achieve relative to the distinct preselection arrangement. However, the variance with regard to a geometric ratio progression is small, and may have little impact on shift quality.

Figure 8:
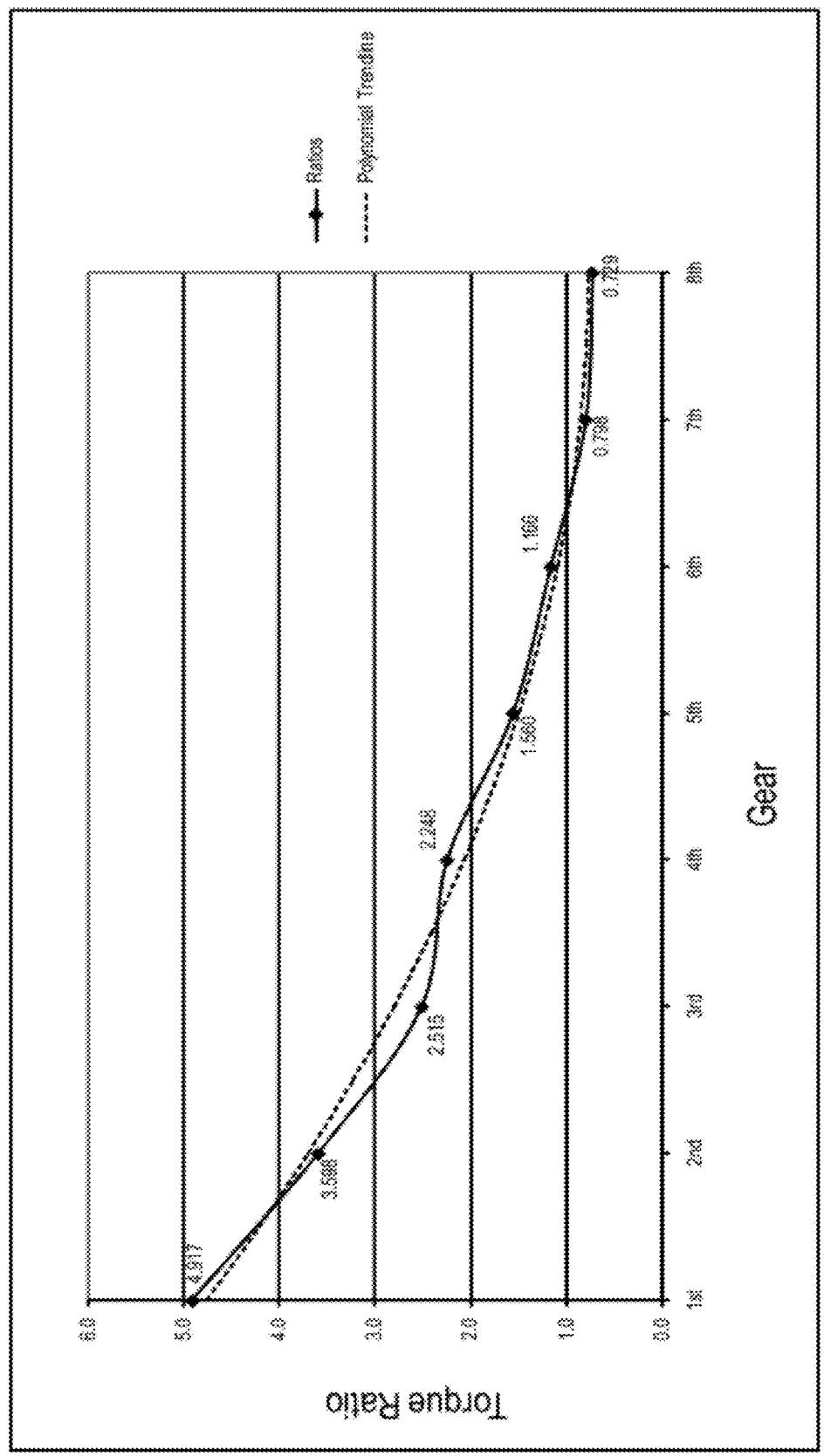
FIG. 8 is a plot of the gear ratios of a concurrent preselection split-axis transmission according to another embodiment of the invention.

FIG. 8 shows a plot of the gear ratios of the concurrent preselection split-axis transmission in FIG. 6 according to another embodiment of the invention.

For this arrangement, the error increases relative to the distinct architecture, with the maximum error on third gear. This issue may be corrected by using an under-drive ratio to smooth the curve, as shown in FIG. 9.

Figure 9:
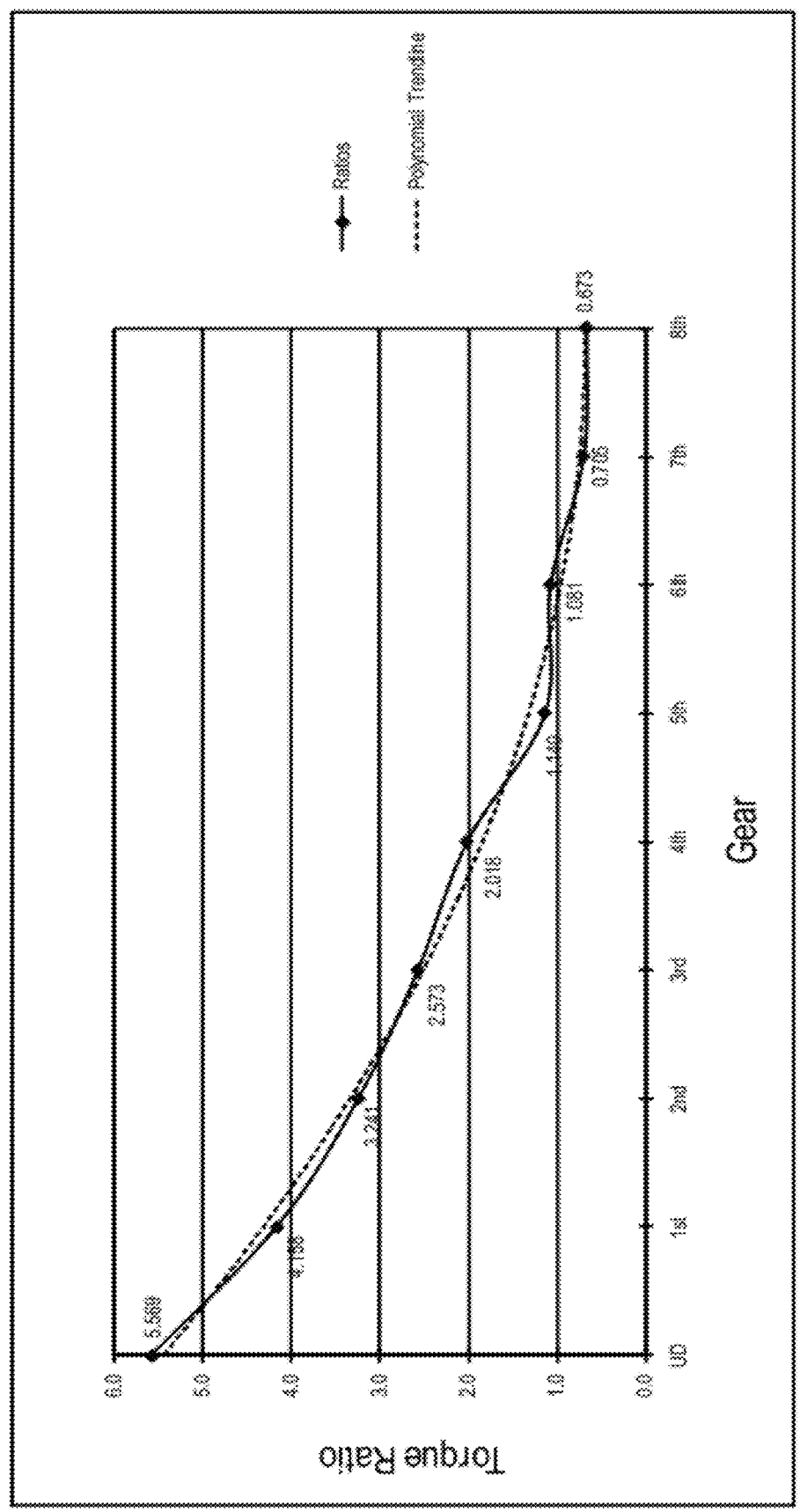
FIG. 9 is a plot of the gear ratios of a concurrent preselection split-axis transmission with an under-drive gear according to another embodiment of the invention.

FIG. 9 shows a plot of the gear ratios of a concurrent preselection split-axis transmission with an under-drive gear according to another embodiment of the invention. In FIG. 9, the maximum error occurs in fifth gear, whereas the maximum error occurs in third gear in FIG. 8. This error may be completely corrected if a distinct driven gear is used at the output, however, the overall impact on shift quality due to the error in fifth gear should be minimal.

Assuming that the goal of the ratio step is to follow a geometric progression, then the ratio selection is based on the following optimization:

$$\text{Ratio}_{x\_Actual} = \text{Ratio}_{x\_Geometric} \pm \text{Tolerance} \quad \text{Eq. 21}$$

The constraints are due to the physical limitations associated with the center distance of the gears on each axis and the cost constraint to minimize the overall number of gears. The center distance (CD) constraint for each axis is given in equations 22 and 23, as $$CD_{1st\_Gear} = CD_{3rd\_Gear} = CD_{5th\_Gear} = CD_{7th\_Gear} \quad \text{Eq. 22}$$

$$CD_{2nd\_Gear} = CD_{4th\_Gear} = CD_{6th\_Gear} = CD_{8th\_Gear} \quad \text{Eq. 23}$$

The cost constraint dictates that the driven gear on the output shaft is common between the even and odd axes. Therefore, only two driven output gears are needed for the eight forward ratios. Ratio flexibility may be increased by having unique driven gears for each gear set if cost and mass are less critical.

These constraints limit which ratio grouping best applies for a given ratio step/spread and the smoothness of the progression curve. If the driven gear on the center axis is not restricted to be common between both the even and odd axes, then the ratio progression smoothness and ratio spread are no longer constrained.

Figure 10:
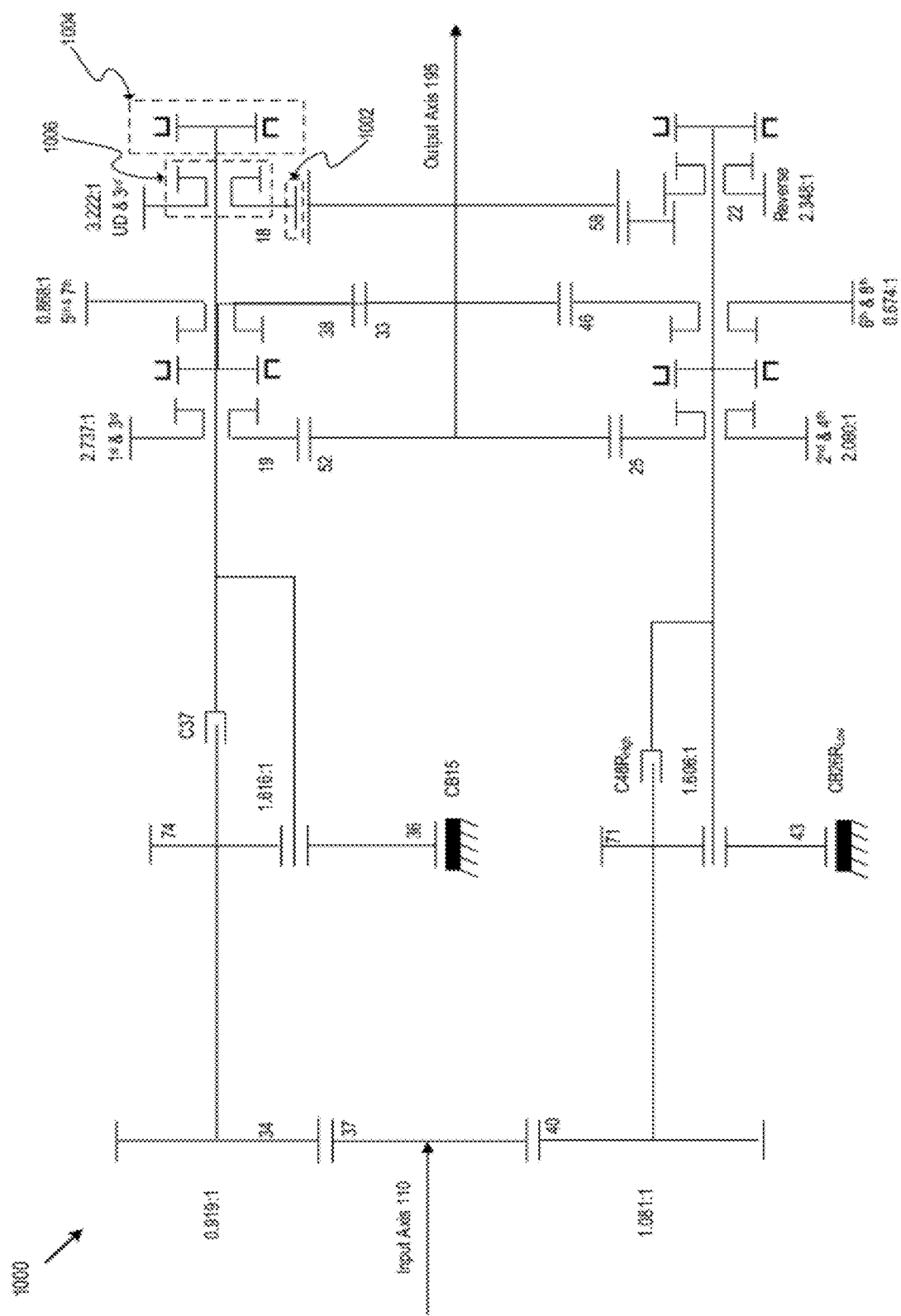
FIG. 10 is a schematic diagram of a concurrent preselection split-axis transmission with an under-drive gear according to another embodiment of the invention.

FIG. 10 shows a schematic diagram of a split-axis transmission that includes an under-drive ratio. Balancing the transmission in this manner may be accomplished by adding single gear 1002, synchronizer 1004, and dog clutch 1006. Since each gear provides two unique ratios due to the planetary gear set, the addition of the single gear actually adds two ratios. However, one of the added ratios may be near one of the other ratios, so the distinct ratios may remain substantively at an odd number.

The packaging of a split-axis transmission with an additional under-drive gear may be optimized to reduce costs and save space. To optimize space usage of the transmission, the preferred location of the added gear is across from the reverse gear so that a common output driven gear may be used, as shown in FIG. 10. The two ratios that accompany this addition may be used, for example, to provide the following: an under-drive ratio and a ratio mathematically close to third gear (i.e., third prime gear); an over-drive and a ratio between fifth and seventh gears; or, finer ratio steps within the ratio progression, e.g., a first prime and third prime gears, or a fifth prime and a seventh prime gears.

FIG. 10 shows a split-axis transmission with an under-drive ratio and a third prime gear according to another embodiment of the invention. To further save costs, the driven gear for reverse is used to provide the under-drive ratio. Therefore, the additional components required may be a synchronizer, clutch, and a gear. FIG. 10 is representative of a space optimized split-axis transmission in general: although FIG. 10 shows a concurrent split-axis transmission, both the concurrent and discrete preselection configurations may be implemented using the gear arrangement in FIG. 10.

The ratio control for a split-axis transmission may be performed, for example, electrically or hydraulically. The hydraulic method of control may be selected due to the use of a multi-plate wet clutch on the even axis for locking the planetary gear set in a 1:1 torque ratio. Although the configuration does not require the use of a multi-plate clutch, shift quality may be enhanced by its use.

The hydraulic circuitry may be divided into two sections. The first section is for the ratio preselection, and the second section is for the ratio-changing control of the planetary gear set.

Figure 11:
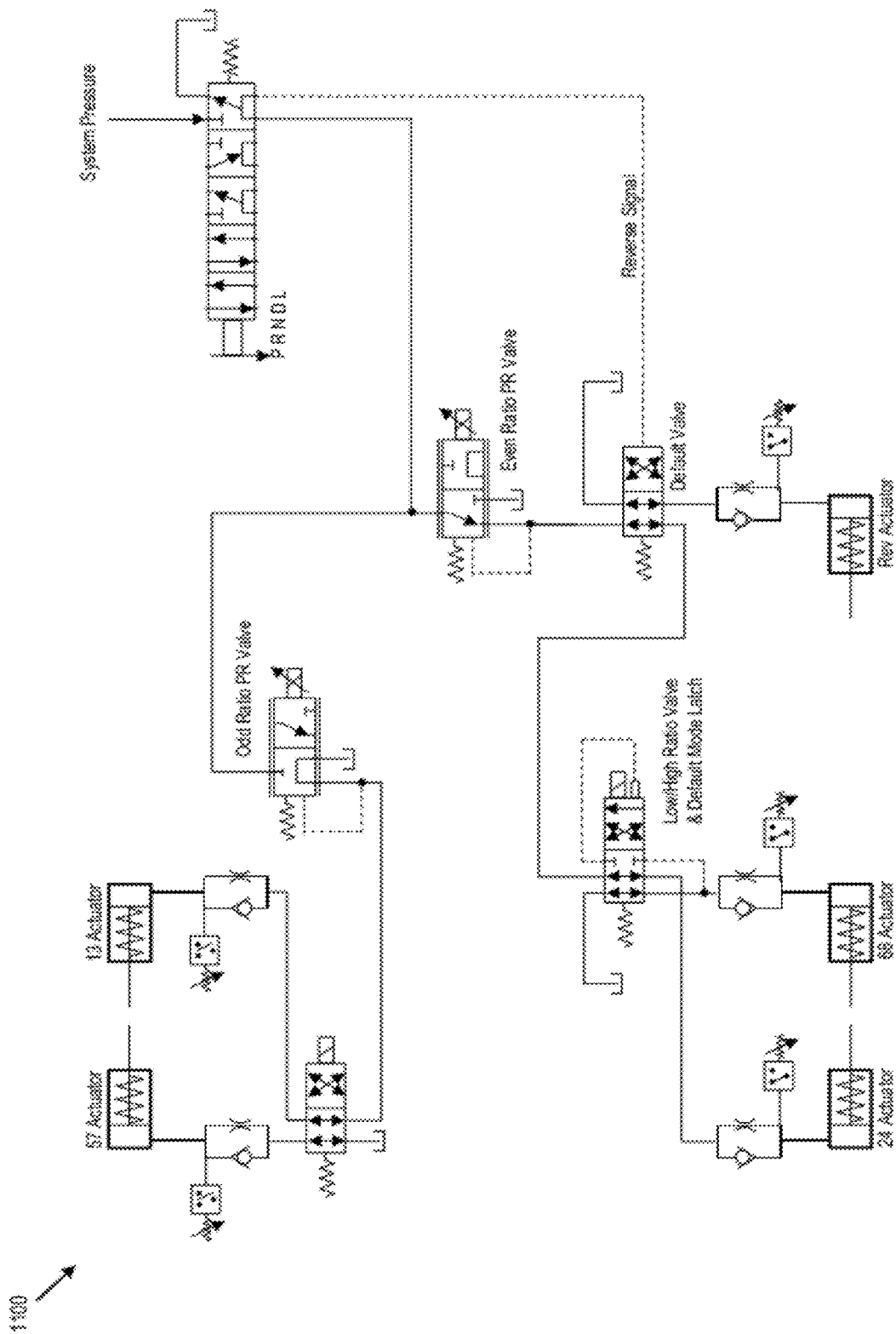
FIG. 11 is a schematic diagram of a hydraulic circuit for ratio preselection according to another embodiment of the invention.

FIG. 11 shows an implementation of hydraulic circuit 1100 for transmission gear ratio preselection according to another embodiment of the invention. Preselection circuitry consists of a pressure-reducing valve to control the pressure within the two distinct circuits. The actuators are isolated with an isolation valve so that both actuators may not be engaged at the same time. This feature provides a hydraulic means that prevents the possibility of a transmission lock-up condition. Losses due to hydraulic flow may be minimized by using jet lubrication for the gears and bearings. The hydraulic controls for this application will require minimal flow because the preselection may not need to respond as quickly as in other transmissions. Therefore, the overall size of the valves can be small, which may reduce the flow gain and associated leakage.

The circuitry for the even axis has an additional latching valve, which is used to provide the desired ratio for a limp-home mode, which provides a means to continue limited operation after a system failure occurs. The limp-home mode ratios are second gear, sixth gear, and reverse gear. The choice of ratios is based on allowing the transmission to have both forward and reverse available during a limited operating mode.

When a system failure results, the even axis circuit remains pressurized to allow for limp-home mode. Since there is a wide ratio spread, it is important to have a low and high ratio for limp-home to avoid the possibility of over-speeding components. A signal pressure to the "Low/High Ratio Valve and Default Mode Latch" is provided to indicate if the transmission is operating in a lower or higher ratio.

Whenever the transmission is operated in a ratio at or above fifth gear, a signal is sent to the "Low/High Ratio Valve and Default Mode Latch" to move this valve to the high range position. When the failure occurs, and the transmission is in a higher ratio, the system will default to sixth gear. The latch is disabled once system pressure reduces below a design threshold.

If the system is operating in the lower ratios during a system fault, the hydraulic circuitry will automatically apply second gear and maintain this ratio as long as the manual value is in the drive position. Since the manual valve has a mechanical link to the range selector, the vehicle will always have the ability to actuate second gear, reverse, neutral, and park.

The dog clutch for reverse may be designed such that it does not latch and will return to null position by spring force when hydraulic pressure is removed. This configuration may be used to guarantee that the reverse actuator will release. The drive actuators 24 and 68 may be coupled, so that the application of pressure to the actuator 24 will release the actuator 68 and vice versa.

Figure 12:
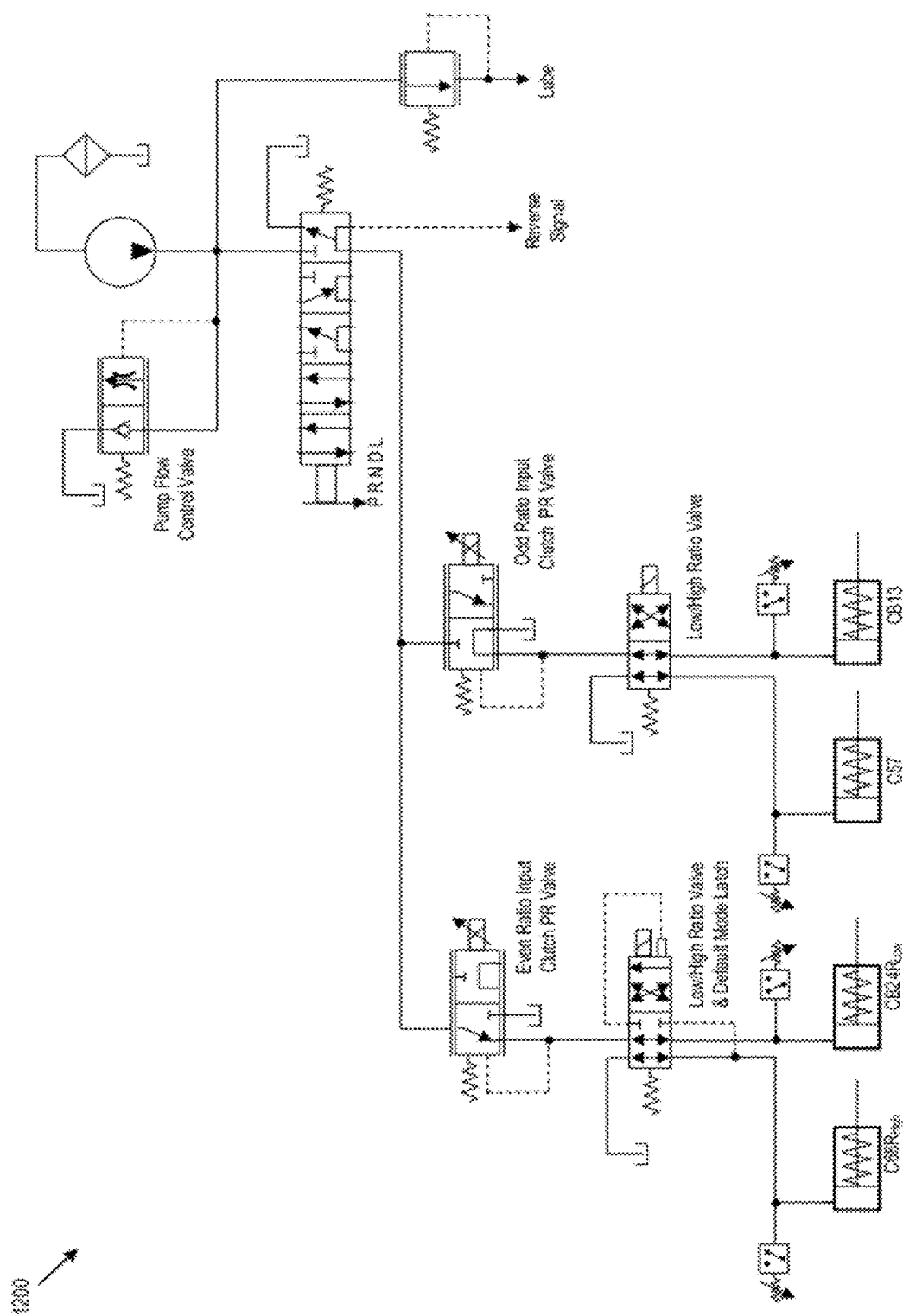
FIG. 12 is a schematic diagram of a clutch control circuit according to another embodiment of the invention.

FIG. 12 shows an input clutch control section according to another embodiment of the invention. Input clutch control section 1200 may use a common actuator to control second, sixth, and reverse gears. This common actuator may be provided with a solenoid valve that is normally high such that the valve remains active during a failure mode. Electrical power requirements of the transmission may be low because the dog clutches have detents so electrical current may be removed once a dog clutch is engaged. As a result, during steady-state operation, the transmission may deactivate all electrical current except for a single band or clutch control circuit used to control the ratio of the planetary gear set.

This control circuitry is similar to the preselect circuitry, in which a pressure-reducing valve is used for each axis along with an isolation valve to avoid applying both clutches on the planetary gear set simultaneously.

The pressure reducing valves for the input clutch control require finer resolution due to the need to control the differential speed of the clutch or brake during a ratio change. Whereas, with the preselection circuit, the pressure control may only need to apply the dog clutch in a manner that minimizes noise, and performs the engagement/disengagement function in a consistent amount of time.

The "Even Ratio Input Clutch PR Valve" may be normally open such that the $CB26R_{Low}$ clutch is active. A torque converter may be used as a launch device such that stalling at zero vehicle speed is not an issue.

The sixth gear latch releases once system pressure reduces to less than $P_{Min}$. Proximity switches may be used for the dog-clutch actuation instead of pressure switches. The hydraulic control circuit may be isolated from the lubrication circuit to increase cleanliness and maintain consistent function.

The split-axis transmission architecture is configured such that it is applicable to both front and rear wheel drive. An advantage for front wheel drive applications is that the output may be located anywhere along the output axis to allow additional integration flexibility. In addition, the transmission may be scaled for any reasonable torque level and input speed.

Figure 7:
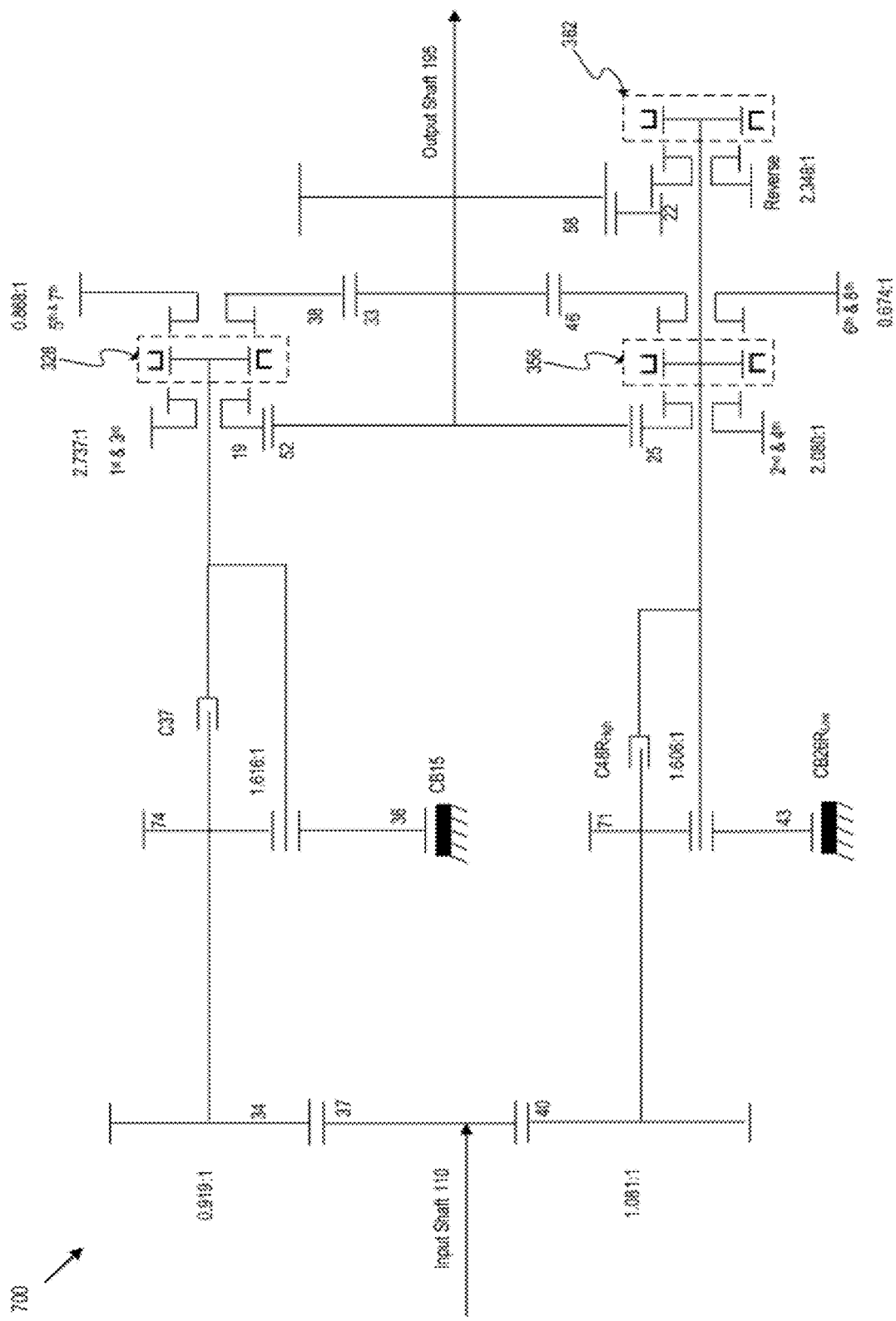
FIG. 7 is a schematic diagram of a concurrent preselection split-axis transmission according to another embodiment of the invention.
Figure 13:
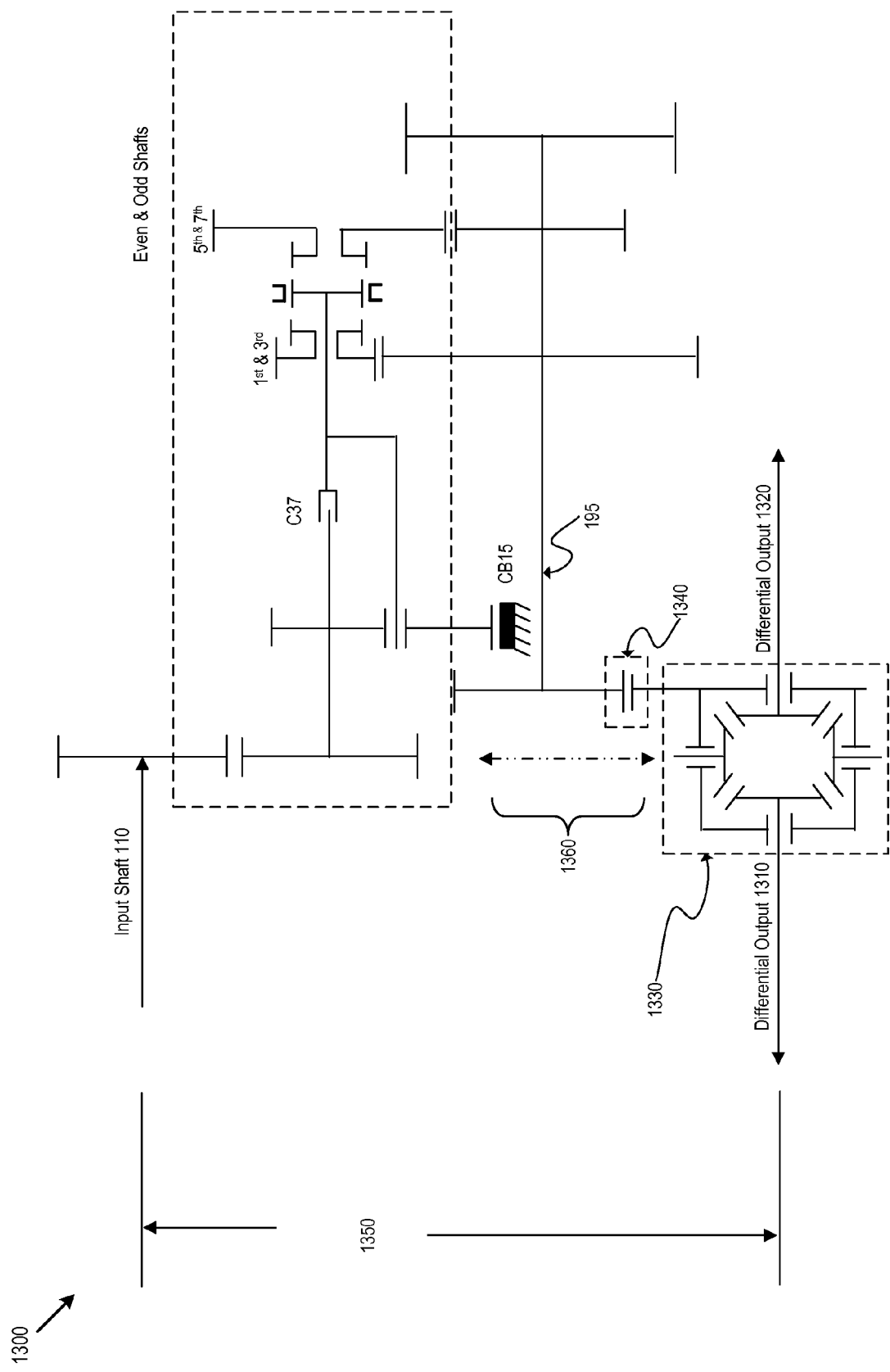
FIG. 13 is a schematic diagram of a front wheel drive axis configuration for a split-axis transmission according to another embodiment of the invention.

FIG. 13 shows a schematic diagram of a split-axis transmission in a front wheel drive configuration 1300 according to another embodiment of the invention. Only the odd intermediate shaft is shown in FIG. 13. The even intermediate shaft is not shown. Output shaft 195 delivers torque to differential 1330 through gear mesh 1340. The torque is delivered to the vehicle wheels (not shown) by differential outputs 1310 and 1320. Configuration 1300 accommodates even-length axles. Due to packaging constraints, the differential centerline may be located anywhere over the output shaft to accommodate virtually any offset. Output shaft 195 may be moved to minimize the height of the transmission if necessary. Also, output shaft 195 may be inline with input shaft 110 to further reduce the overall height. The input and output shafts can be located anywhere on vertical plane 1350. The input and output shafts can be on-axis 1360 to minimize torque steer. For purposes of comparison, FIG. 7 shows a split-axis transmission 700 according to another embodiment of the invention, which may be used in a rear wheel drive configuration.

Figure 14:
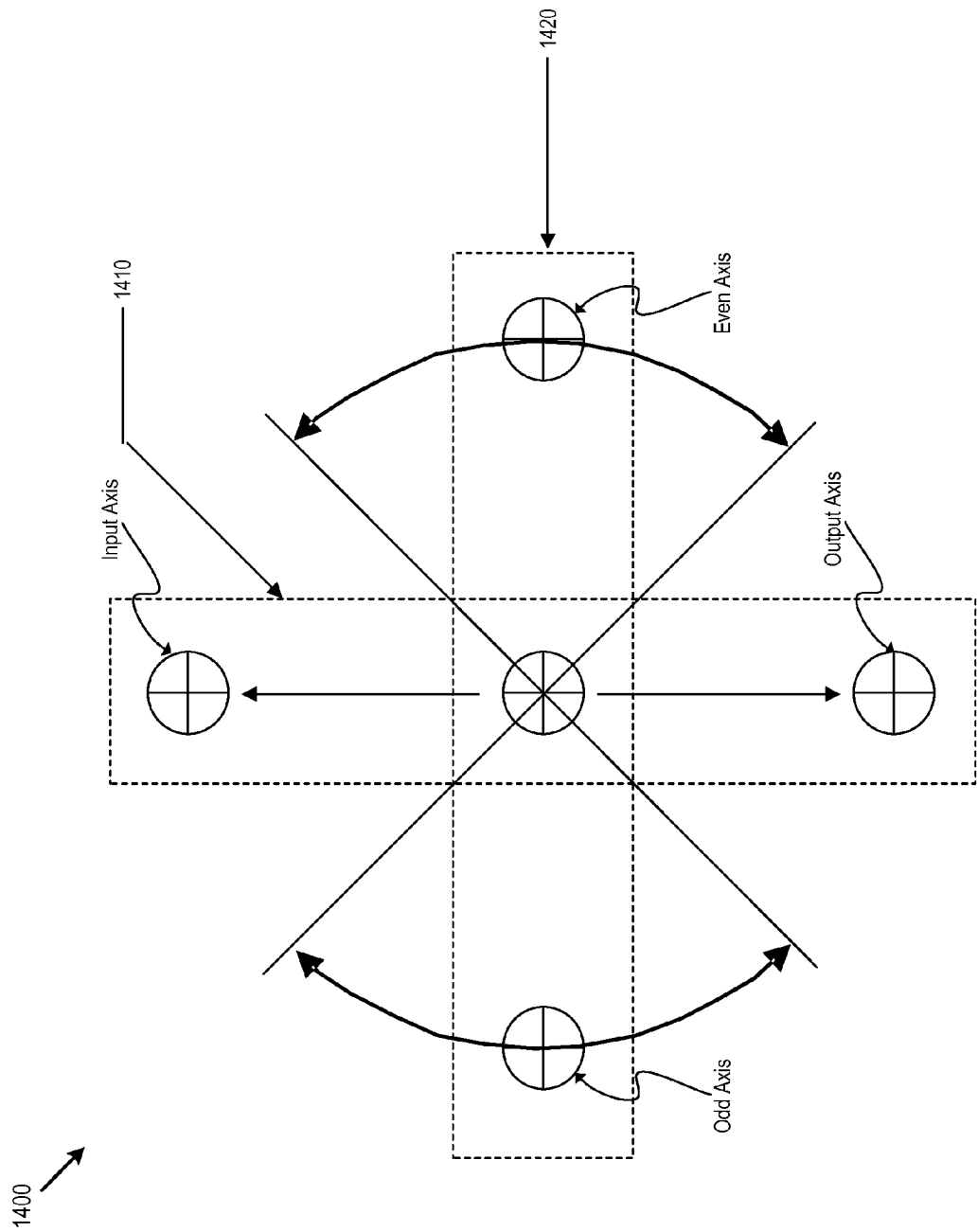
FIG. 14 is a plot of the potential positioning of input, output, and intermediate axes of a split-axis transmission according to another embodiment of the invention.

FIG. 14 shows how the input shaft, output shaft, and intermediate shafts may be configured in a split-axis transmission according to another embodiment of the invention. An axis represents a line along which a shaft may generally lie. The input and output axis can be fixed anywhere in plane 1410. The input and output axis do not have to be inline. One axis can be high and the other axis can be low, if necessary. For example, the input and output shafts may lie along the same axis. The transmission may be arranged as a traditional manual transmission, or may be arranged such that each shaft is located in the same plane to provide a short, low profile package. The odd and even axes can be fixed anywhere along plane 1420. The odd and even axes do not need to be offset the same amount. There is flexibility if the package constraints require rolling of one axis, and not the other. The transmission may be compact due to the ability to share powerflow routes with more than one ratio—a feature that results from the use of the planetary gear sets. The multi-axis aspect of the transmission may allow for packaging flexibility, minimal volume and axial space requirements for a given number of ratios.

The layout and packaging of the internal components for both the front wheel drive and rear wheel drive configurations is similar. One difference may be that the differential is integrated into the transmission for a front wheel configuration.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A transmission comprising:
   an input shaft;
   an output shaft fixedly rotatably connected to a third group of gears;
   a first transmission assembly mechanically connected to the input shaft, the first transmission assembly comprising:
      a first intermediate shaft configured to connect with a first group of gears via a first group of clutches, wherein the first group of gears mesh with the third group of gears;
      a first planetary gear set, comprising:
         a first ring gear configured to engage and disengage with the first intermediate shaft;
   a second transmission assembly mechanically connected to the input shaft and the output shaft, the second transmission assembly comprising:
      a second intermediate shaft configured to connect with a second group of gears via a second group of clutches, wherein the second group of gears mesh with the third group of gears; and
      a second planetary gear set, comprising:
         a second ring gear configured to engage and disengage with the second intermediate shaft.

2. The transmission as in claim 1, wherein the first planetary gear set is configured to couple torque from the input shaft to the first intermediate shaft.

3. The transmission as in claim 1 wherein the first planetary gear set is configured to transmit torque from the first intermediate shaft to the output shaft.

4. The transmission as in claim 3 further comprising a gear set configured to selectively transmit torque from the first intermediate shaft to the output shaft.

5. The transmission as in claim 4 wherein the gear set comprises a first gear and a second gear, wherein the gear set and the first planetary gear set are ratioed to provide concurrent gear preselection.

6. The transmission as in claim 5 wherein the gear set further comprises a third gear configured to selectively transmit torque from the second intermediate shaft to the output shaft.

7. The transmission as in claim 6 wherein the first gear and the second gear constantly mesh with each other, and wherein the second gear and the third gear constantly mesh with each other.

8. The transmission as in claim 7 wherein the first planetary gear set and the second planetary gear set are independently configurable.

9. The transmission as in claim 8 wherein a transmission torque ratio from the input shaft to the output shaft is determined by configuring the first planetary gear set or the second planetary gear set to transmit torque from the input shaft to the output shaft,
wherein the transmission torque ratio is equal to a first ratio when the first planetary gear set is configured to couple torque at a first high ratio,
wherein the transmission torque ratio is equal to a second ratio when the second planetary gear set is configured to couple torque at a second high ratio,
wherein the transmission torque ratio is equal to a third ratio when the first planetary gear set is configured to couple torque at a first low ratio,
wherein the transmission torque ratio is equal to a fourth ratio when the second planetary gear set is configured to couple torque at a second low ratio, and
wherein the first ratio is greater than the second ratio, the second ratio is greater than the third ratio, and the third ratio is greater than the fourth ratio.

10. The transmission as in claim 6 wherein the gear set further comprises a fourth gear and a fifth gear constantly mesh with each other and configured to selectively transmit torque from the first intermediate shaft to the output shaft, and wherein the gear set further comprises a sixth gear in constant mesh with the fifth gear and configured to selectively couple torque from the second intermediate shaft to the output shaft.

11. The transmission as in claim 10 wherein the first planetary gear set and the second planetary gear set are independently configurable,
wherein a transmission torque ratio from the input shaft to the output shaft is equal to a first ratio when the first planetary gear set is configured to couple torque at a first high ratio and the first gear and the second gear are configured to couple torque from the first intermediate shaft to the output shaft,
wherein the transmission torque ratio from the input shaft to the output shaft is equal to a second ratio when the second planetary gear set is configured to couple torque at a second high ratio and the third gear and the second gear are configured to couple torque from the second intermediate shaft to the output shaft,
wherein the transmission torque ratio from the input shaft to the output shaft is equal to a third ratio when the first planetary gear set is configured to couple torque at a first high ratio and the fourth gear and the fifth gear are configured to couple torque from the first intermediate shaft to the output shaft,
wherein the transmission torque ratio from the input shaft to the output shaft is equal to a fourth ratio when the second planetary gear set is configured to couple torque at a second high ratio and the fifth gear and the sixth gear are configured to couple torque from the second intermediate shaft to the output shaft,
wherein the transmission torque ratio from the input shaft to the output shaft is equal to a fifth ratio when the first planetary gear set is configured to couple torque at a first low ratio and the first gear and the second gear are configured to couple torque from the first intermediate shaft to the output shaft,
wherein the transmission torque ratio from the input shaft to the output shaft is equal to a sixth ratio when the second planetary gear set is configured to couple torque at a second low ratio and the third gear and the second gear are configured to couple torque from the second intermediate shaft to the output shaft,
wherein the transmission torque ratio from the input shaft to the output shaft is equal to a seventh ratio when the first planetary gear set is configured to couple torque at a first low ratio and the fourth gear and the fifth gear are configured to couple torque from the first intermediate shaft to the output shaft,
wherein the transmission torque ratio from the input shaft to the output shaft is equal to a eighth ratio when the second planetary gear set is configured to couple torque at a second low ratio and the fifth gear and the sixth gear are configured to couple torque from the second intermediate shaft to the output shaft, and
wherein the transmission first ratio is greater than the second ratio, the second ratio is greater than the third ratio, the third ratio is greater than the fourth ratio, the fourth ratio is greater than the fifth ratio, the fifth ratio is greater than the sixth ratio, the sixth ratio is greater than the seventh ratio, and the seventh ratio is greater than the eighth ratio.

12. The transmission as in claim 11 wherein the first gear, the second gear, the third gear, the fourth gear, the fifth gear, and the sixth gear are selected from a group consisting of spur gears, bevel gears, worm gears, hypoid gears, planetary gears, herringbone gears, and helical gears.

13. The transmission as in claim 1 wherein the first planetary gear set comprises a sun gear, at least one planetary gear, a brake, and a clutch connecting the first ring gear and the first intermediate shaft.

14. The transmission as in claim 13 wherein the clutch is selected from a group consisting of a dog clutch, a wet clutch, and a dry clutch.

15. The transmission as in claim 1, wherein the ring gear of the first planetary gear set is configured to directly engage and disengage with the first intermediate shaft via a first clutch; and
wherein the ring gear of the second planetary gear set is configured to directly engage and disengage with the second intermediate shaft via a second clutch.

16. The transmission comprising:
a first planetary gear set providing at least part of a first torque path from an input shaft to an output shaft by engaging a first ring gear with a first intermediate shaft; and
a second planetary gear set connected in parallel with the first planetary gear set and providing at least part of a second torque path from the input shaft to the output shaft by engaging a second ring gear with a second intermediate shaft;

wherein
> the first intermediate shaft is configured to connect with a first group of gears via a first group of clutches;
> the second intermediate shaft is configured to connect with a second group of gears via a second group of clutches;
> the output shaft is fixedly rotatably connected to a third group of gears; and
> the first group of gears and the second group of gears respectively mesh with the third group of gears.

17. The transmission as in claim 16 further comprising a plurality of gears including the first group of gears, the second group of gears and the third group of gears configured to selectively transmit torque from the first torque path to the output shaft, and to transmit torque from the second torque path to the output shaft.

18. The transmission as in claim 17 wherein the plurality of gears are configured to provide concurrent gear preselection.

19. The transmission as in claim 16 further comprising a plurality of gears configured to transmit torque from the input shaft to the first torque path, and to transmit torque from the input shaft to the second torque path.

* * * * *